United States Patent
Vincent et al.

(10) Patent No.: US 9,470,308 B2
(45) Date of Patent: Oct. 18, 2016

(54) METHOD AND APPARATUS FOR CONTROLLING THE ENGAGEMENT OF AN INPUT GEAR WITH AN OUTPUT GEAR

(71) Applicant: JAGUAR LAND ROVER LIMITED, Warwickshire (GB)

(72) Inventors: Darren Vincent, Warwickshire (GB); Simon Sutton, Warwickshire (GB); Rob Jerger, Warwickshire (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 211 days.

(21) Appl. No.: 14/283,761

(22) PCT Filed: Nov. 22, 2012

(86) PCT No.: PCT/EP2012/073408
§ 371 (c)(1),
(2) Date: May 21, 2014

(87) PCT Pub. No.: WO2013/076218
PCT Pub. Date: May 30, 2013

(65) Prior Publication Data
US 2014/0330493 A1 Nov. 6, 2014

(30) Foreign Application Priority Data
Nov. 22, 2011 (GB) .................................. 1120113.4

(51) Int. Cl.
*F16H 61/04* (2006.01)
*F16H 61/02* (2006.01)
*B60K 17/346* (2006.01)

(52) U.S. Cl.
CPC ...... *F16H 61/0202* (2013.01); *F16H 61/0403* (2013.01); *B60K 17/3467* (2013.01); *F16H 2061/047* (2013.01)

(58) Field of Classification Search
None
See application file for complete search history.

(56) References Cited

U.S. PATENT DOCUMENTS 5,582,558 A  12/1996  Palmeri et al.
6,123,642 A   9/2000  Saito et al.
(Continued)

FOREIGN PATENT DOCUMENTS

DE   102008042345 A1   4/2010
EP        0947744 A2   6/1999
(Continued)

OTHER PUBLICATIONS

International Search Report for International application No. PCT/EP2012/073408 dated Apr. 5, 2013.
(Continued)

*Primary Examiner* — Edwin A Young
(74) *Attorney, Agent, or Firm* — Carlson, Gaskey & Olds

(57) ABSTRACT

The present invention relates to a method of engaging an input gear with an output gear in a drivetrain (3). The input gear is coupled to an input shaft (7) and the output gear is coupled to an output shaft (9). The method includes calculating a target input speed (S1') for the input shaft (7) to match a rotational speed of the input gear to a rotational speed of the output gear. The calculated target input speed (S1') is then modified to include an offset and the input speed (S1) of the input shaft (7) is then modified in dependence on the modified target input speed (S1"). The input gear and the output gear engage when the input speed (S1) of the input shaft (7) at least substantially matches the modified target input speed (S1"). The present invention also relates to an apparatus.

18 Claims, 1 Drawing Sheet

(56) References Cited

U.S. PATENT DOCUMENTS

| | | | |
|---|---|---|---|
| 6,358,183 B1* | 3/2002 | Hughes | B60W 10/06 477/111 |
| 2002/0053248 A1 | 5/2002 | Yamamoto | |
| 2003/0130088 A1* | 7/2003 | Schiele | B60W 30/18027 477/39 |
| 2005/0288150 A1* | 12/2005 | Hitch | F02D 41/0225 477/98 |
| 2008/0004779 A1 | 1/2008 | Sah | |
| 2010/0113217 A1* | 5/2010 | Terwart | F16H 61/0403 477/79 |
| 2010/0197448 A1 | 8/2010 | Hoffman | |
| 2013/0157809 A1* | 6/2013 | Steeby | F16H 61/70 477/111 |

FOREIGN PATENT DOCUMENTS

| | | |
|---|---|---|
| GB | 2312936 A | 12/1997 |
| GB | 2335010 A | 9/1999 |
| JP | 2002098215 A | 4/2002 |
| JP | 2005090603 A | 4/2005 |
| WO | 2010027320 A1 | 3/2010 |

OTHER PUBLICATIONS

Combined Search and Examination Report under Sections 17 and 18(3) for Application No. GB1120113.4 dated Mar. 14, 2012.
Patent Office of the People's Republic of China, Search Report for Application No. 201280065225.4 dated May 12, 2015.

* cited by examiner

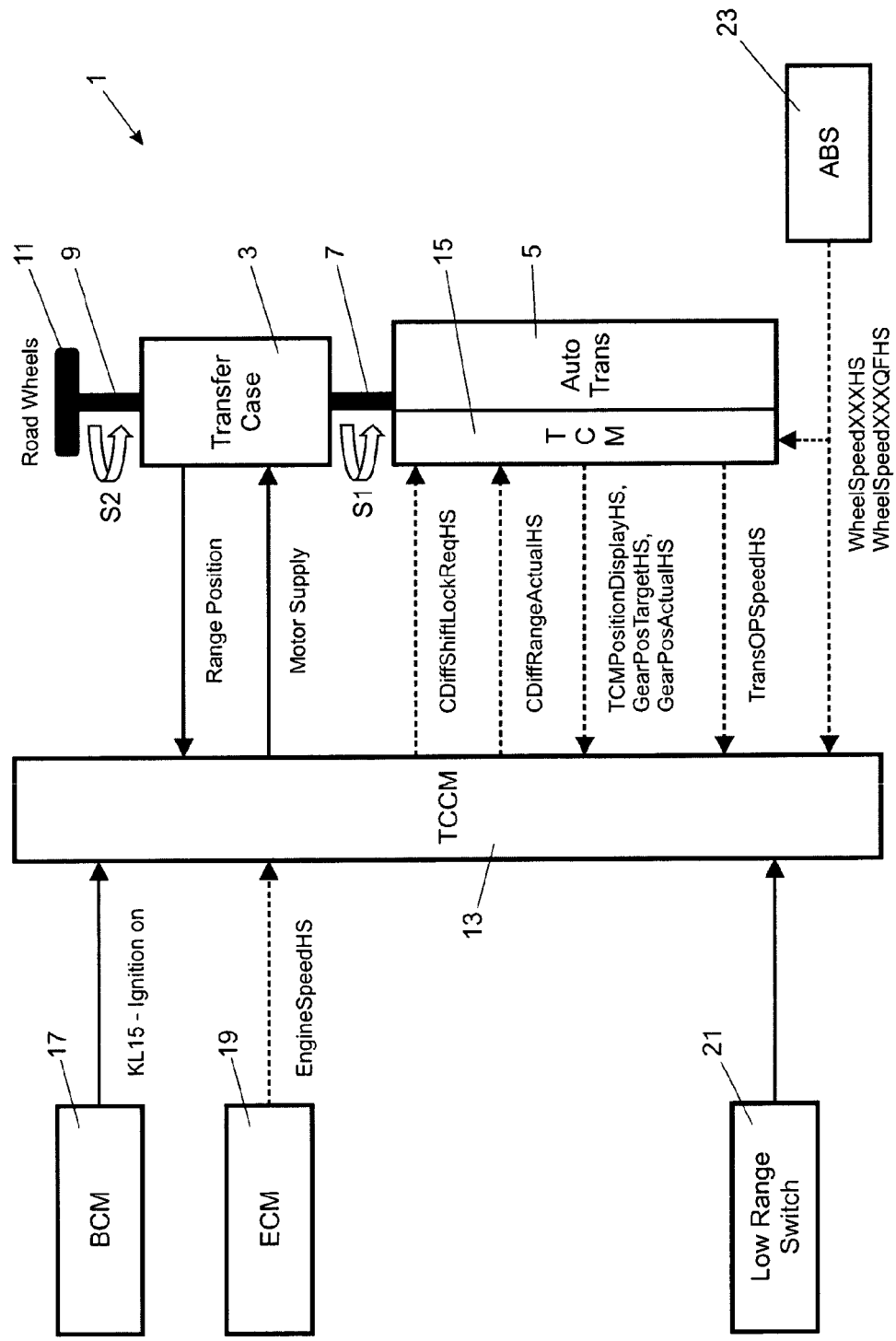

METHOD AND APPARATUS FOR CONTROLLING THE ENGAGEMENT OF AN INPUT GEAR WITH AN OUTPUT GEAR

TECHNICAL FIELD

The present invention relates to a method and apparatus for controlling the engagement of an input gear and an output gear. The input gear and the output gear can form part of a transfer case for a motor vehicle. Aspects of the invention relate to a method, to an apparatus, to a transmission system and to a vehicle.

BACKGROUND OF THE INVENTION

A transfer case having a low gear range and a high gear range is commonly provided in a four wheel drive vehicle. The torque input from the transmission is passed to a transfer box input shaft. A differential, such as a Torsen® differential, can be provided in the transfer case to split torque between the front and rear wheels of the vehicle. The high range is used for normal road driving and also for off-road driving across dry, level terrain. The low range may be engaged for low speed maneuvering, such as reversing a trailer, negotiating steep slippery surfaces or boulder strewn terrain. The low range can also be used for extreme off-road conditions where progress in high range cannot be maintained.

In high range, a synchroniser sleeve in the transfer case couples the transfer box input shaft directly to the differential housing. The differential splits the torque between two side gears. One side gear is connected by splines and passes the torque to a rear output flange to drive the rear wheels. The second side gear is connected to a chain drive sprocket and passes the torque, via the chain, to the front output flange to drive the front wheels.

In low range, the synchroniser sleeve is moved and connects a planetary carrier to the differential housing. The torque from the transmission is now directed through a sun gear of an epicyclic gearset and, via the pinion gears and pinion gear shafts, into the planetary carrier. An annulus gear of the epicyclic gearset is secured inside the casing and generates the low range ratio, for example 2.69:1. The torque is then passed, via the synchroniser sleeve, to the differential housing where it is split between the two side gears.

The synchroniser sleeve is actuated by an electric motor driving a transfer fork along a linear path. To facilitate changes from the high range to the low range while the vehicle is on the move, an inner and outer blocker ring and a cone are provided. When the fork moves the sleeve in a first direction, the inner and outer blocker rings and the cone are pushed together and mesh at an angle, thereby operating as a synchromesh to provide smooth engagement.

The transfer case input shaft also has an outer blocker ring and a cone which are pushed together when the fork moves the sleeve in a second direction. The outer blocker ring and the cone also mesh together at an angle and operate as a synchromesh to provide smooth transition into the high range.

Providing a synchromesh increases the complexity and cost of the transfer case. Moreover, wear on the components in the transfer case can result in additional maintenance being required. The present invention seeks to address one or more of these problems. Embodiments of the invention may provide a method or a system which removes the need for a mechanical synchromesh to smooth the transition from a low range to a high range; and/or from a high range to a low range.

SUMMARY OF THE INVENTION

According to one aspect of the present invention there is provided a method of engaging an input gear with an output gear in a drivetrain, wherein the input gear is coupled to an input shaft, and the output gear is coupled to an output shaft, the method comprising the steps of:

(i) calculating a target input speed for the input shaft to match a rotational speed of the input gear to a rotational speed of the output gear;

(ii) modifying the calculated target input speed to include an offset;

(iii) modifying an input speed of the input shaft in dependence on the modified target input speed; and (iv) engaging the input gear and the output gear when the input speed of the input shaft at least substantially matches the modified target input speed.

By modifying the input speed of the input shaft such that the rotational speeds of the input gear and the output gear are brought at least substantially into alignment, it is not necessary to provide a synchromesh to mechanically match the speeds of the input and output gears. A tooth on tooth engagement (whereby the teeth of the input and output gears are aligned and the gears are prevented from engaging) could occur if the speeds of the input and output gears were the same at the time of engagement. Accordingly, the step of modifying the calculated target input speed introduces an offset between the rotational speeds of the input and output gears which can, advantageously, help to avoid a tooth on tooth contact. Thus, the rotational speed of the input gear is close enough to that of the output gear to be engaged without the need for a synchromesh, but offset sufficiently (e.g. by 50 rpm) so as to reduce the likelihood of a tooth on tooth engagement.

An output speed of the output shaft could be modified to bring the rotational speeds of the input and output gears substantially into alignment (either in addition to, or instead of setting the input speed of the input shaft). However, altering the output speed would change the speed at which the vehicle is travelling and this may prove unacceptable to the driver. By modifying the speed of the input shaft, the rotational speeds of the input and output gears can be brought substantially into alignment without altering the vehicle speed.

The method can be implemented to selectively engage either a first input gear or a second input gear with the output gear in the powertrain. The first and second input gears could be provided in respective first and second input gear trains having different gear ratios. The method can enable the output gear to be engaged with either the first input gear train or the second input gear train. The first and second input gear trains could, for example, correspond to high and low ranges in a transfer case. The method can be used to change from a high range to a low range and/or from a low range to a high range.

The step of modifying an input speed of the input shaft in dependence on the modified target input speed (step (iii)) can be performed when the input shaft is de-coupled from the output shaft. For example, the input speed can be altered after a first input gear has been disengaged and before a second input gear is engaged. With the input and output shafts de-coupled, changes to the input speed can be performed without affecting the output speed.

When changing from a first input gear to a second input gear, the required change in the input speed of the input shaft can be calculated based on the ratio of the first and second gear trains. The target input speed can be calculated by multiplying the current input speed by the ratio of the second gear to the first gear. However, this approach does not allow for changes in output speed that may occur after the output gear has been disengaged. Alternatively, the target input speed can be calculated by multiplying the rotational speed of the output gear by the gear ratio of the input gear to be engaged. If the input gear is provided in a first input gear train, the rotational speed of the output gear would be multiplied by the gear ratio of the first input gear train. As the rotational speed of the output gear can be measured continuously (for example by measuring the speed of a vehicle driven by the output shaft), this approach can account for changes in the rotational speed of the output shaft. The rotational speed of the output gear can be determined from the vehicle speed. In particular, the rotational speed of the output gear can be calculated by multiplying the wheel speed by the total driveline differential ratios.

The input shaft can be coupled to an output of a transmission. The transmission can be an automatic, semi-automatic or manumatic transmission. The transmission can be coupled to a motor or an engine. The method may require that that the gear selector is in neutral before steps (iii) and (iv) are initiated.

The step of modifying the input speed of the input shaft in dependence on the modified target input speed can comprise reducing the input speed. The input speed may have to be reduced if the method is implemented to change from a first input gear to a lower second input gear. A braking torque may be applied to the input shaft to reduce its speed. In arrangements in which the input shaft is coupled to a transmission, this reduction in the input speed can be achieved by changing the transmission to a lower gear and/or relying on internal braking forces within the transmission. The transmission is typically in neutral during the range change so the engine speed is at idle. The selected transmission ratio and drag torque can increase the output shaft speed of the transmission. Selection of additional gears (for example, two or more gears) in the transmission will increase the transmission drag torque, but torque converter slip can prevent the engine stalling.

The step of modifying the input speed of the input shaft in dependence on the modified target input speed can comprise increasing the input speed. The input speed may have to be increased if the method is implemented to change from a first input gear to a higher second input gear. In arrangements in which the input shaft is coupled to a transmission, a higher gear in the transmission may be engaged to increase the output speed of the transmission; and/or an increase in torque may be supplied to the transmission to increase the input speed of the input shaft. The transmission control module can request an increase in the engine torque which results in an increase in the output speed of the engine. The input speed of the transmission is thereby increased resulting in an increase in the output speed of the transmission (and the input shaft coupled to the input gear).

The drivetrain can be in the form of a transfer case comprising a high range and a low range. A first input gear can be provided in a first low gear train to provide said high range; and a second input gear can be provided in a second input gear train to provide said low range. The first and second input gears can be engaged with the output gear to select the high low ranges. The method can be implemented to change from said high range to said low range and/or from said low range to said high range.

The calculated target input speed can be modified by adding or subtracting a predetermined offset. The predetermined offset can be in the range 5-20 rpm; 20-40 rpm; 40-60 rpm; 60-80 rpm or 80-100 rpm. For example, an offset of 50 rpm can be subtracted from the calculated target input speed. Alternatively, the calculated target input speed can be multiplied by a target speed modifier. The modifier could be less than or greater than one (1). The modifier could be a fixed integer or could be a variable, for example based on a predetermined scale.

The method can further comprise the step of detecting a tooth on tooth engagement within the drivetrain when the input gear and the output gear are engaged. The tooth on tooth engagement could, for example, be detected by a sensor and/or an increase in the current drawn by a range change actuator. Upon detection of a tooth on tooth engagement, the method may comprise repeating the step of engaging the input and output gears, optionally after a set period of time has elapsed. A tooth on tooth engagement can be determined when the input gear and the output gear fail to engage.

A differential, for example a Torsen® differential, can be coupled to the output shaft. The differential can split the output torque for supply to the front and rear wheels of a four wheel drive vehicle.

According to another aspect of the invention there is provided apparatus for controlling the engagement of an input gear with an output gear in a drivetrain, wherein the input gear is coupled to an input shaft, and the output gear is coupled to an output shaft, the apparatus comprising control means configured to:
  calculate a target input speed for the input shaft to match a rotational speed of the input gear to a rotational speed of the output gear;
  modify the calculated target input speed to include an offset;
  modify an input speed of the input shaft in dependence on the modified target input speed; and
  engage the input gear and the output gear when the input speed of the input shaft at least substantially matches the modified target input speed.

The control means may comprise: a shaft speed processor for determining an input speed of the input shaft and an output speed of the output shaft; a processor for calculating the target input speed of the input shaft; a modifier for modifying the calculated target input speed to include the offset; a speed controller for modifying the input speed of the input shaft in dependence on the modified target input speed; and a control signal generator for generating a gear change control signal to initiate the engagement of the input gear and the output gear when the input speed of the input shaft at least substantially matches the modified target input speed.

The shaft speed processor can be connected to a first speed sensor for measuring the input speed of the input shaft and a second speed sensor for measuring the output speed of the output shaft. In an automotive application, the first speed sensor could be provided in a transmission control module, and the second speed sensor could be provided in the anti-lock braking system.

The control signal generator can control an actuator to initiate engaging the input and output gears.

The input shaft can be connected to an output shaft of a transmission. The transmission can be an automatic, a semi-automatic or a manumatic transmission.

The speed controller can control the transmission (either directly or indirectly via a transmission control unit); and/or the speed controller may control an engine or motor connected to the transmission (either directly or indirectly via an engine control unit).

The speed controller can be operable to control the transmission to reduce the input speed of the input shaft. The speed controller may cause a braking torque to be applied to the transmission. The braking torque can be a result of internal friction/drag within the transmission. Alternatively, or in addition, the speed controller can initiate a change to a lower gear in the transmission to reduce the output speed of the transmission.

The speed controller can be operable to control the transmission to increase the input speed of the input shaft. The speed controller can initiate a change to a higher gear in the transmission to increase the input speed of the input shaft. Alternatively, or in addition, the speed controller can request an increase in torque from an engine or motor connected to the transmission. The resulting increase in the output speed of the engine will increase the input speed of the transmission and, therefore, the output speed of the transmission to which the input shaft is connected. The control signal could, for example, be supplied to a transmission control module to initiate the gear change and/or an engine control module to increase torque supplied to the transmission.

The drivetrain can be a transfer case comprising a high range and a low range. The control unit can be adapted to change from said high range to said low range and/or from said low range to said high range.

The modifier can add or subtract a predetermined offset to the calculated target input speed. For example, the predetermined offset could be in the range 5-20 rpm; 20-40 rpm; 40-60 rpm; 60-80 rpm or 80-100 rpm. An offset of 50 rpm could be added to or subtracted from the calculated target input speed. Alternatively, the calculated target input speed could be multiplied by a modifier.

The control means may comprise a detector for detecting a tooth on tooth engagement when the input gear and the output gear engage. The control signal generator may repeat the gear change control signal upon detection of a tooth on tooth engagement. A time delay may be introduced before repeating the gear change control signal.

The speed controller and/or the control signal generator may be operable only when the gear selector for the transmission is in a neutral position.

The method described herein can be machine-implemented. In a yet further aspect, the present invention relates to a computer system comprising: programmable circuitry; and software encoded on at least one computer-readable medium to program the programmable circuitry to implement the method described herein.

The apparatus described herein can comprise a computational processor operating a series of instructions stored in hardware, firmware or software. Equally, the method described herein can be implemented by a computational processor operating a series of instructions stored in hardware, firmware or software. A computational processing apparatus can be utilised to control the operational steps described herein. The computational processor can be configured to perform computational instructions stored in memory or in a storage device.

The present invention also relates to a computer program for controlling a computational processor, the computer program being executable to cause the computational processor to operate in accordance with the method(s) described herein.

The apparatus according to the present invention is particularly well suited for automotive vehicles.

According to a further aspect, the present invention provides a transmission system or a vehicle having apparatus as set out in any of the preceding paragraphs.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments, unless such features are incompatible.

BRIEF DESCRIPTION OF THE DRAWINGS

An embodiment of the present invention will now be described, by way of example only, with reference to the accompanying FIGURE which shows a schematic diagram of a transfer case control system embodying one form of the invention.

DETAILED DESCRIPTION OF AN EMBODIMENT

A transfer case control system 1 for a motor vehicle will now be described with reference to FIG. 1. The transfer case control system 1 controls a transfer case 3 (also referred to as a transfer box) and an automatic transmission 5. The transfer case 3 comprises a high input gear train and a low input gear train for respective high and low ranges. The transfer case control system 1 in accordance with the present invention allows on the move changes between the high and low ranges without the need for synchromesh gears in the transfer case 3.

The transfer case 3 is driven by a transfer case input shaft 7 connected to the output shaft of the transmission 5. The transfer case 3 has a transfer case output shaft 9 which drives a set of road wheels 11. The transfer case input shaft 7 rotates at a first speed S1 and the transfer case output shaft 9 rotates at a second speed S2. When operating in the low range the transfer case 3 provides a gear ratio of 3:1 to give the vehicle a low range crawl speed. When operating in the high range the transfer case 3 provides a direct drive from the transmission output shaft 7 giving a 1:1 gear ratio. It will be appreciated that other gear ratios could be implemented for the high and low ranges.

The transfer case 3 can change between the high and low ranges only when the following predefined conditions are satisfied: (a) the vehicle ignition is turned on; (b) the vehicle speed is within defined limits; and (c) the transmission selector is in a neutral position. A further predefined condition is that the engine is running, but this is not essential as a hybrid vehicle could operate by electric motor only with the engine stopped. A Transfer Case Control Module (TCCM) 13 ensures that these conditions have been met and sends a control signal (Motor_Supply) to an actuator (not shown) in the transfer case 3. The actuator drives a transfer mechanism to shift from the low to high ranges and from the high to low ranges. The transfer case 3 also provides the TCCM 13 with a range position signal (Range_Position) to indicate whether the high range or the low range is currently engaged.

The TCCM 13 is connected to a Transmission Control Module (TCM) 15 which controls the transmission 5. The TCM 15 sends the TCCM 13 operational data, including: an operating speed of the transmission output shaft 7 (TransOPSpeedHS); the current gear selected by the automatic transmission 5 (GearPosActualHS); and a target gear to be selected by the automatic transmission 5 (GearPosTargetHS). The TCCM 13 can instruct the TCM 15 to lock the gear selector for the transmission 5 in neutral (CDiffShiftLockReqHS). The TCCM 13 also communicates with the TCM 15 to indicate whether the high or low range is currently engaged in the transfer case 3 (CDiffRangeActualHS).

A Body Control Module (BCM) 17 provides an ignition signal (KL15-Ignition on) to the TCCM 13 to confirm that the vehicle ignition is on. An Engine Control Module (ECM) 19 provides the TCCM 13 with engine speed data (EngineSpeedHS). The operating output speed of the transmission is transmitted from the TCM 15 to the TCCM 13 as an operating speed signal (TransOPSpeedHS) corresponding to the input speed of the transfer case input shaft 7.

A Low Range Switch 21 is operated by the user to initiate a change in the range of the transfer case 3. A range control signal is supplied from the Low Range Switch 21 to the TCCM 13. An Anti-lock Braking System (ABS) 23 transmits wheel speed data (WheelSpeedXXXHS and WheelSpeedXXXQFHS) to both the TCCM 13 and the TCM 15 to enable the vehicle speed and the output speed of the transfer case output shaft 9 to be determined.

The high and low input gear trains of the transfer case 3 are selected by a synchroniser sleeve to provide the respective ranges. The synchroniser sleeve is movable along a linear path to engage a first (high) input gear coupled to the transfer case input shaft 7 via the high input gear train; or to engage a second (low) input gear coupled to the transfer case input shaft 7 via the low input gear train. The transfer mechanism operative in response to the control signal (Motor_Supply) from the TCCM 13 comprises a fork and rail assembly to displace the synchroniser sleeve. The first (high) input gear is engaged when the synchroniser sleeve is in a first position (for example a rearward position); and the second (low) input gear train is engaged when the synchroniser sleeve is in a second position (for example a forward position). The transfer case 3 is in a neutral state when the synchroniser sleeve is in an intermediate position and neither the first (high) input gear nor the second (low) input gear is engaged. The synchroniser sleeve remains coupled to the transfer case output shaft 9 throughout normal operation.

The present invention enables on the move changes without the need for synchromesh gears in the transfer case 3 when the first (high) input gear or the second (low) input gear is to engage the output gear. To achieve this, the TCM 15 substantially matches the rotational speed of the target input gear with the rotational speed of the output gear plus or minus an offset to help prevent a tooth on tooth engagement.

The speed of the input gear can be controlled by adjusting the speed of the transmission 5 to alter the first speed S1 of the transfer case input shaft 7. The first speed S1 can be reduced by changing to a lower gear within the transmission 5 and/or allowing internal friction losses within the transmission 5 to reduce the output speed. The first speed S1 can be increased by changing to a higher gear in the transmission 5 and/or increasing the torque applied to the transmission 5 by an engine or electric motor. An increase in the torque supplied from the engine will increase the input speed of the transmission and, therefore, the first speed S1 of the transfer case input shaft 7. The speed of the transmission 5 is adjusted when the transfer case 3 is in a neutral state so as not to affect the rotational speed of the wheels 11.

The input gear to be engaged (i.e. the target gear) is either the first (high) input gear or the second (low) input gear, depending on whether a range change from low to high or from high to low is being performed. The first speed S1 of the transfer case input shaft 7 corresponds to the output speed of the transmission 5 and is supplied to the TCCM 13 as the operating speed signal (TransOPSpeedHS).

The output gear is the synchroniser sleeve which is coupled to the transfer case output shaft 9. The transfer case output shaft 9 is connected to the vehicle wheels 11 and, therefore, the second speed S2 of the output gear can be calculated from the wheel speed data (WheelSpeedXXXHS and WheelSpeedXXXQFHS) supplied by the ABS 23.

To calculate a target input speed S1', the second speed S2 of the output gear is multiplied by the gear ratio of the input gear train to be engaged. If the first (high) gear train is to be engaged, the second speed S2 is multiplied by 1 (as the high gear train has a gear ratio of 1:1). If the second (low) input gear train is to be engaged, the second speed S2 is multiplied by 3 (as the low gear train has a gear ratio of 3:1).

A predetermined offset is then applied to modify the calculated target input speed S1' to generate a modified target input speed S1''. The offset can, for example, be applied by adding or subtracting a defined speed. In the present embodiment, the calculated target input speed S1' is reduced by 50 rpm to provide the offset.

The input speed S1 of the input shaft 7 is modified in dependence on the modified target input speed S1'' to enable the selected input gear to engage the output gear. By setting the input shaft speed S1 to the modified target input speed S1'' (rather that the calculated target input speed S1'), the likelihood of a tooth on tooth engagement occurring between the input gear and the output gear is reduced. It will be appreciated by those skilled in the art that, while the input shaft speed S1 may be said to be 'set' to the modified target input speed S1'', the engagement of respectively rotating input and output gears is a dynamic process. Accordingly, the rotational speed of the input shaft need not match exactly the modified target input speed S1'' at the precise moment that the input gear engages the output gear. Rather, it is sufficient that the engagement takes place when the input shaft speed substantially matches the modified target input speed S1'', i.e. such that the rotational speed of the input gear is close enough to that of the output gear to be engaged without the need for a synchromesh, but offset sufficiently (e.g. by 50 rpm) so as to reduce the likelihood of a tooth on tooth engagement.

The high/low range is selected by the driver using the Low Range Switch 21. A range change can only be performed when the selector for the transmission 5 is in a neutral position. The accelerator pedal (not shown) must not be depressed when a range change is in progress. If high or low range is requested and the transmission selector is in a position other than neutral, an alert will be provided instructing the driver to select neutral.

The transfer box 3 allows range changes when the vehicle is moving, within set limitations. In particular, for high to low range changes, the vehicle speed must not exceed 10 mph (16 km/h); and for low to high range changes the vehicle speed must not exceed 30 mph (48 km/h). If the vehicle speed is higher than the stipulated parameters, an alert will be provided instructing the driver to slow down. The range change will be initiated only when the vehicle speed is within the specified range. A road speed of less than 2 mph (3 km/h) can be interpreted by the TCCM 13 as a static shift (vehicle not moving).

The operation of the TCCM 13 according to the present invention will now be described with reference to on the move range changes from low to high and from high to low.

Range Change on the Move: Low to High

The present invention allows the vehicle to perform a low to high range change whilst the vehicle is moving below a speed threshold. The invention can provide a refined range change without the use of a synchromesh in the transfer case 3.

An on the move range change request is received by the TCCM 13 when the driver presses the Low Range Switch 21 when the vehicle is moving. The TCCM 13 determines that the vehicle's ignition is on via the BCM 17 signal (KL15-Ignition on); and that the engine is running via the ECM 19 speed signal (EngineSpeedHS). The TCCM 13 then interrogates the TCM 15 to determine that the transmission 5 is in neutral (TCMPositionDisplayHS, GearPosTargetHS, GearPosActualHS). A check is also performed by the TCCM 13 to determine that the vehicle speed (WheelSpeed-XXXHS) is below an appropriate threshold, typically less than or equal to 30 mph (48 km/h).

The range change will be aborted, and optionally an alert provided for the driver, if the TCCM 13 determines one or more of the following: the vehicle speed is above the threshold; the transmission 5 is not in neutral; or a fault is detected. If the parameters are satisfied, the range change can proceed.

The main flow of events for an on the move range change from low to high are as follows:
 (i) The TCCM 13 requests automatic transmission gear selector is locked in neutral (CDiffShiftLockReqHS);
 (ii) The TCM 15 locks the automatic transmission gear selector in neutral;
 (iii) The transfer case 3 starts the range change by applying a current to the transfer case motor;
 (iv) The input speed S1 of the transfer case 3 is matched to the output speed S2 (which corresponds to the vehicle speed measured by the ABS 23) divided by the low gear ratio, less a 50 rpm offset;
 (v) The transfer case 3 completes the range change which is confirmed by a range position sensor;
 (vi) The TCCM 13 removes request for the automatic transmission gear selector to be locked in neutral (CDiffShiftLockReqHS);
 (vii) The TCM 15 unlocks the transmission gear selector from the neutral position; and
 (viii) The transmission 5 reverts to normal operation.

The input speed S1 of the transfer case 3 is matched in step (iv) by applying a braking torque to the output of the transmission 5.

The sequence of events is altered if a tooth on tooth condition is detected when the transfer case motor is engaged. In particular, events (i) to (iv) are implemented as above and then:
 (a) The TCCM 13 detects a tooth on tooth condition due to high motor current and the range position indicating the range has not been completed;
 (b) The TCCM reduces (or reverses slightly) the motor current and then reapplies the current; the input to the transfer case will rotate as the pressure is removed due to the automatic transmission output being greater than zero due to the 50 rpm offset.

Steps (v) to (viii) are then implemented as above.

The successful completion of these process steps results in a low to high range change having been implemented. A temporary message of 'High Range Selected' can be displayed in an instrument pack message centre (not shown); and a low range icon switched off on the instrument pack.

Range Change on the Move: High to Low

The present invention also allows the vehicle to perform a high to low range change whilst the vehicle is moving below a speed threshold. The invention can provide a refined range change without the use of a synchromesh in the transfer case 3.

An on the move range change request is received by the TCCM 13 when the driver presses the Low Range Switch 21 when the vehicle is moving. The TCCM 13 then performs the same parameter checks that were implemented for the low to high range change. In particular, the TCCM 13 determines that the vehicle's ignition is on via the BCM 17 signal (KL15-Ignition on); and that the engine is running via the ECM 19 speed signal (EngineSpeedHS). The TCCM 13 then interrogates the TCM 15 to determine that the transmission 5 is in neutral (TCMPositionDisplayHS, GearPosTargetHS, GearPosActualHS). A check is also performed by the TCCM 13 to determine that the vehicle speed (WheelSpeedXXXHS) is below an appropriate threshold, typically less than or equal to 10 mph (16 km/h).

The range change will be aborted, and optionally an alert provided for the driver, if the TCCM 13 determines one or more of the following: the vehicle speed is above the threshold; the transmission 5 is not in neutral; or a fault is detected. If the parameters are satisfied, the range change can proceed.

The main flow of events for an on the move range change from high to low are as follows:
 (i) The TCCM 13 requests automatic transmission gear selector is locked in neutral (CDiffShiftLockReqHS);
 (ii) The TCM 15 locks automatic transmission gear selector in neutral;
 (iii) The transfer case 3 starts the range change by applying a current to the transfer case motor;
 (iv) The input speed S1 of the transfer case 3 is matched to the output speed S2 (which corresponds to the vehicle speed) multiplied by the low gear ratio, less a 50 rpm offset;
 (v) The transfer case 3 completes the range change which is confirmed by the range position sensor;
 (vi) The TCCM 13 removes the request for the automatic transmission gear selector to be locked in neutral (CDiffShiftLockReqHS);
 (vii) The TCM 15 unlocks the transmission gear selector from the neutral position; and
 (viii) The transmission 5 reverts to normal operation.

The input speed S1 of the transfer case 3 is matched in step (iv) by selecting a higher gear and/or sending a positive torque request to the engine/electric motor.

The sequence of events is altered if a tooth on tooth condition is detected when the transfer case motor is engaged. In particular, events (i) to (iv) are implemented as above and then:
 (a) The TCCM 13 detects a tooth on tooth condition due to high motor current and the range position indicating the range has not completed; and
 (b) The TCCM 13 reduces (or reverses slightly) the motor current and then reapplies the current; the input shaft 7 to the transfer case will rotate as the pressure is removed due to the transmission 5 output being greater than zero due to the 50 rpm offset.

Steps (v) to (viii) are then implemented as above.

The successful completion of these process steps results in a high to low range change having been implemented. A temporary message of 'Low Range Selected' can be displayed in the instrument pack message centre (not shown); and a low range icon switched on in the instrument pack.

As outlined above, the transfer case control system 1 facilitates changes between the high and low ranges on the move without the need for synchromesh gears in the transfer case 3. The transfer case control system 1 can be used with a conventional transfer case 3 of the type described in the introduction of the present application. To reduce the complexity of the transfer case 3, the synchromesh gears, such as the cones and blocker rings, can be omitted or replaced with spacers.

The method described herein can also be used for static range changes (i.e. changes when the vehicle is stationary) as the offset occurs inherently as the transmission starts to drive the transfer case input shaft 7 once selected.

The transfer case 3 has been illustrated as having a single output shaft 9. However, two output shafts could be provided to enable four wheel drive. For example, a front output shaft could drive the front wheels of the vehicle and a rear output shaft could drive the rear wheels of the vehicle. Thus, the transfer case 3 can provide a permanent four wheel drive, torque splitting transmission for the vehicle. A differential assembly, such as a Torsen® differential, can be provided to split the torque between the front and rear wheels in a four wheel drive system. In such an arrangement, the synchroniser sleeve in the transfer case 3 could be permanently coupled to the differential assembly.

The present invention has been described as an alternative to providing synchromesh in the transfer case 3. However, the invention could be implemented in conjunction with synchromesh to help protect the constituent components of the synchromesh.

The method and apparatus described above can be used to change from a high range to a low range and/or from a low range to a high range in a transfer case of, for example, an off-road vehicle. In this case, the need for a synchromesh gear arrangement for each of a high range to low range change and a low range to high range change may be obviated. It will often be the case that an 'off-road' vehicle will be stationary when a high range to low range change is made (e.g. because the driver has stopped to survey the 'off-road' terrain to be traversed). In contrast, it will often be the case that the driver will wish to change from the low range to the high range when the vehicle is moving (e.g. because the vehicle has been driven from 'off-road' terrain onto a tarmac road). Accordingly, in one embodiment of the present invention, the method and apparatus described previously may only be employed to control the engagement of input and output gears of a transfer case when a low range to high range change is selected, to enable an 'on the move' range change. In the case of a high to low range change, it may simply be required that such a change can only be made when it is determined that the vehicle is stationary. Accordingly, the need for a synchromesh gear arrangement for each of the high to low range change and the low to high range change is obviated.

It will be appreciated that various changes and modifications can be made to the embodiment described herein without departing from the scope of the present invention.

The invention claimed is:

1. A method of engaging an input gear with an output gear in a drivetrain, wherein the input gear is coupled to an input shaft coupled to a transmission, and the output gear is coupled to an output shaft, the method comprising:

(i) calculating a target input speed for the input shaft to match a rotational speed of the input gear to a rotational speed of the output gear;
(ii) modifying the calculated target input speed to include an offset;
(iii) modifying an input speed of the input shaft in dependence on the modified target input speed; and
(iv) engaging the input gear and the output gear when the input speed of the input shaft substantially matches the modified target input speed,
wherein a gear change to a lower gear is made in the transmission to reduce the input speed of the input shaft and wherein a gear change to a higher gear is made in the transmission to increase the input speed of the input shaft.

2. A method as claimed in claim 1, wherein the input gear is provided in an input gear train having a first input gear ratio; the target input speed being calculated by multiplying the rotational speed of the output gear by the first input gear ratio.

3. A method as claimed in claim 1, wherein the drivetrain is a transfer case comprising a first input gear train to provide a high range and a second input gear train to provide a low range; and the method is implemented to change from said high range to said low range and/or from said low range to said high range.

4. A method as claimed in claim 1, wherein the calculated target input speed is modified by adding or subtracting a predetermined offset; or by multiplying the calculated target input speed by a target speed modifier.

5. A method as claimed in claim 1, comprising detecting a tooth on tooth engagement within the drivetrain when the input gear and the output gear fail to engage.

6. A method as claimed in claim 5 further comprising repeating the step of engaging the input and output gears upon detection of tooth on tooth engagement.

7. A method as claimed in claim 1 wherein a change in torque supplied to the transmission is made to further modify the input speed of the input shaft.

8. A method as claimed in claim 7, wherein modifying the input speed of the input shaft in dependence on the modified target input speed comprises decreasing the torque supplied to the transmission.

9. A method as claimed in claim 7, wherein modifying the input speed of the input shaft in dependence on the modified target input speed comprises increasing the torque supplied to the transmission.

10. An apparatus for controlling the engagement of an input gear with an output gear in a drivetrain, wherein the input gear is coupled to an input shaft coupled to a transmission, and the output gear is coupled to an output shaft, the apparatus comprising control means configured to:

calculate a target input speed for the input shaft to match a rotational speed of the input gear to a rotational speed of the output gear;
modify the calculated target input speed to include an offset;
modify an input speed of the input shaft in dependence on the modified target input speed; and
engage the input gear and the output gear when the input speed of the input shaft substantially matches the modified target input speed,
wherein the control means includes a speed controller that is operable to control the transmission to reduce the input speed of the input shaft by changing to a lower gear and wherein the speed controller is operable to control the transmission to change to a higher gear to increase the input speed of the input shaft.

11. An apparatus as claimed in claim 10, wherein the control means further comprises:
   a shaft speed processor for determining an input speed of the input shaft and an output speed of the output shaft;
   a processor for calculating the target input speed of the input shaft;
   a modifier for modifying the calculated target input speed to include the offset; and
   a control signal generator for generating a gear change control signal to initiate the engagement of the input gear and the output gear when the input speed of the input shaft substantially matches the modified target input speed.

12. An apparatus as claimed in claim 11, wherein the drivetrain is a transfer case comprising a first input gear train providing a high range and a second input gear train providing a low range; and the control unit is adapted to change from said high range to said low range and/or from said low range to said high range.

13. An apparatus as claimed in claim 11, wherein the modifier adds or subtracts a predetermined offset to the calculated target input speed; or multiplies the calculated target input speed by a target speed modifier.

14. An apparatus claimed in claim 11, comprising a detector for detecting a tooth on tooth engagement when the input gear and the output gear engage.

15. An apparatus as claimed in claim 14 wherein the control signal generator is configured to repeat the gear change control signal upon detection of tooth on tooth engagement.

16. An apparatus as claimed in claim 10 wherein the apparatus is configured to further control the transmission to change a torque supply to the transmission in order to modify the input speed of the input shaft.

17. An apparatus as claimed in claim 16 wherein the speed controller is operable to reduce the input speed of the input shaft by requesting a decrease in torque supplied to the transmission.

18. An apparatus as claimed in claim 16, wherein the speed controller is operable to request an increase in the torque supplied to the transmission to increase the input speed of the input shaft.

* * * * *